United States Patent
Inada et al.

(10) Patent No.: US 6,215,198 B1
(45) Date of Patent: *Apr. 10, 2001

(54) GENERATING CONTROL DEVICE FOR HYBRID VEHICLE

(75) Inventors: Eiji Inada; Shinichirou Kitada; Toshio Kikuchi; Hiroyuki Hirano; Takeshi Aso; Yuutarou Kaneko, all of Kanagawa-ken (JP)

(73) Assignee: Nissan Motor Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,497

(22) Filed: Jun. 25, 1997

(30) Foreign Application Priority Data

Jun. 25, 1996 (JP) .................................................. 8-164807

(51) Int. Cl.⁷ .............................. F02N 11/06; H02P 9/04
(52) U.S. Cl. .................. 290/40 C; 290/40 A; 290/40 B; 290/40 D
(58) Field of Search ........................... 290/40 C; 322/58, 322/59, 64; 477/5, 3; 320/61, 63, 22, 23, 30, 57; 318/139; 364/424, 426

(56) References Cited

U.S. PATENT DOCUMENTS

| | | | |
|---|---|---|---|
| 4,335,429 | * 6/1982 | Kawakatsu | 364/424 |
| 5,264,764 | * 11/1993 | Kuang | 318/139 |
| 5,345,761 | * 9/1994 | King et al. | 60/274 |
| 5,359,228 | * 10/1994 | Yoshida | 290/17 |
| 5,492,190 | * 2/1996 | Yoshida | 180/65.4 |
| 5,623,197 | * 4/1997 | Roseman et al. | 320/61 |
| 5,659,240 | * 8/1997 | King | 320/30 |
| 5,713,814 | * 2/1998 | Hara et al. | 477/5 |
| 5,760,486 | * 6/1998 | Uchinami et al. | 290/40 C |
| 5,821,706 | * 10/1998 | Koga | 318/139 |

FOREIGN PATENT DOCUMENTS 5-328522    12/1993    (JP) .

* cited by examiner

Primary Examiner—Elvin Enad
(74) Attorney, Agent, or Firm—McDermott, Will & Emery

(57) ABSTRACT

A generating control device for a hybrid vehicle includes a motor 13 for driving the hybrid vehicle, a battery 12 for driving the motor, a generator 11 for supplying the motor 13 and the battery 12 with electricity, an engine 10 for driving the generator 11 and a control unit 16. In operation, the unit 16 operates to change the operations of the generator 11 and the engine 10 in both of the normal generating mode and the battery protection mode. Therefore, it is possible to reduce the deterioration of the battery 12 of the hybrid vehicle and to ensure the fine driving performance.

1 Claim, 12 Drawing Sheets

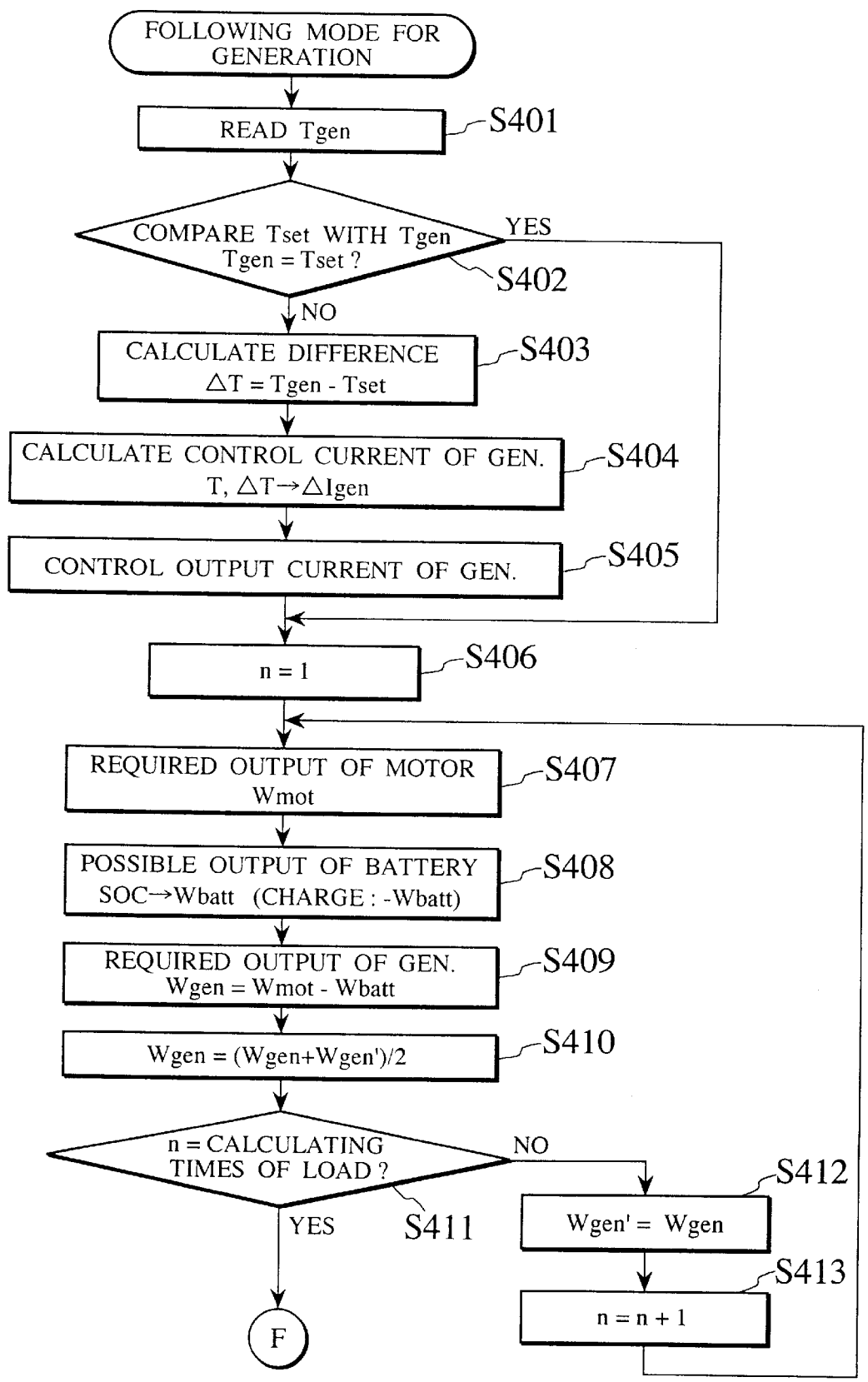

GENERATING CONTROL DEVICE FOR HYBRID VEHICLE

BACKGROUND OF THE INVENTION

The present invention relates to a generating control device for a hybrid vehicle which includes an engine, a generator driven by the output of the engine, a battery and a control unit for controlling operations of these elements.

In recent years, a series hybrid electric vehicle (SHEV) equipped with a generator-and an engine for driving it, has been developed in order to increase a cruising range of an electric vehicle. In this art, it is also known a system which is installed in the hybrid vehicle and which allows it to travel by electric energy supplied from a battery when the battery is charged fully. On the other hand, when the charged energy in the battery decreases, the system starts the engine in order to charge the battery by electric power supplied from the generator. Thereafter, when the charging amount reaches a prescribed value, the engine is inacivated.

In such a series hybrid electric vehicle, if the engine of the vehicle is used little in comparison with that of a gasoline-fueled automobile (not electrical car), the vehicle exhibits a low-pollution car on one hand. On the other hand, depending on methods of controlling the engine and the generator, there is a possibility to cause pollution problems equal to or greater more than those of the gasoline-fueled automobile.

Furthermore, it is supposed that, depending on the control method of the generator, repeated overcharging or overdischarging operations for the battery may cause the battery's life span to be shortened in comparison with that of an electric car, so that cost and time for exchanging the battery (or batteries) with another may be increased disadvantageously.

In the prior art, for example, Japanese Unexamined Patent Publication (Kokai) No. 5-32852 discloses one of the conventional generating control devices for the hybrid vehicles. This generating control device operates to drive the generator for assisting the battery in response to loads of the drive motor in the hybrid electrical vehicle, while the device judges the loads according to the charged energy in the battery, an opening of an accelerator pedal, degree of slope etc. and adjusts an opening of a throttle valve.

In the above-mentioned conventional generating control device of the hybrid vehicle, however, the battery deteriarates quickly since the device is not able to determine if the battery cannot be charged or discharged.

SUMMARY OF THE INVENTION

It is therefore an object of the present invention to provide a generating control device of a hybrid electric vehicle (SHEV), which is capable of restricting the battery from deteriorating and which can ensure fine driving performance of the vehicle.

The object of the present invention described above can be accomplished by a generating control device for a hybrid vehicle, comprising:

a motor for driving the hybrid vehicle;

a battery for driving the motor;

a generator for supplying the motor and the battery with electric power;

an engine for driving the generator; and control means for changing operations of the generator and the engine in accordance with a plurality of operational modes for restricting the battery from deteriorating. With the arrangement mentioned above, by changing the operations of the generator and the motor according to the plural modes for restricting the battery from deteriorating, it is possible to reduce the deterioration of the battery of the hybrid vehicle and to ensure the fine driving performance.

In the present invention, preferably, the control means carries out judgment of the operational modes on the basis of battery temperature of the battery. In this case, by carrying out the judgment of mode on the basis of the battery temperature, it is possible to reduce the deterioration of the battery of the hybrid vehicle and to ensure the fine driving performance.

More preferably, the control means carries out judgment of the operational modes on the basis of battery temperature of the battery, electrical energy charged in the battery and a required driving force the motor should be induce to produce. Also in this case, by carrying out the judgment of mode on the basis of the battery temperature, the charged energy in the battery and the required motor output, it is possible to reduce the deterioration of the battery of the hybrid vehicle.

In the present invention, it is preferable that when the battery temperature exceeds a prescribed temperature, the control means prohibits the charging and discharging operation of the battery and drives the engine at a constant engine speed, so that generating energy can be produced by the generator in response to a required motor output. Also in this case, it is possible to reduce the deterioration of the battery of the hybrid vehicle and to ensure fine driving performance.

It is preferable that when the battery can charge or discharge and it is required to allow the generating energy of the generator to follow the required motor output, the control means operates to drive the generator at a constant torque and controls the generating energy on the basis of the present engine speed. Also in this case, it is possible to reduce the deterioration of the battery of the hybrid vehicle and to ensure fine driving performance.

More preferably, when the battery is one which exhibits an endothermic reaction during its charging operation, the control means establishes the generating energy by adding charging energy corresponding to the endothermic reaction to the required motor output operates to drive the generator at a constant torque and controls the generating energy on the basis of the engine speed. In this case, it is possible to reduce the deterioration of the battery of the hybrid vehicle and to ensure fine driving performance.

The above and other features and advantages of this invention will become apparent, and the invention itself will best be understood, from a study of the following description and appended claims, with reference had to the attached drawings showing a preferred embodiment of the invention.

BRIEF DESCRIPTION OF THE DRAWINGS

FIGS. 6A and 6B are respective elements of a flow chart of the operation of the control unit in a followed generating mode;

DESCRIPTION OF THE PREFERRED EMBODIMENT

Two embodiments of the present invention will be described with reference to the drawings.

(First embodiment)

Figure 1:
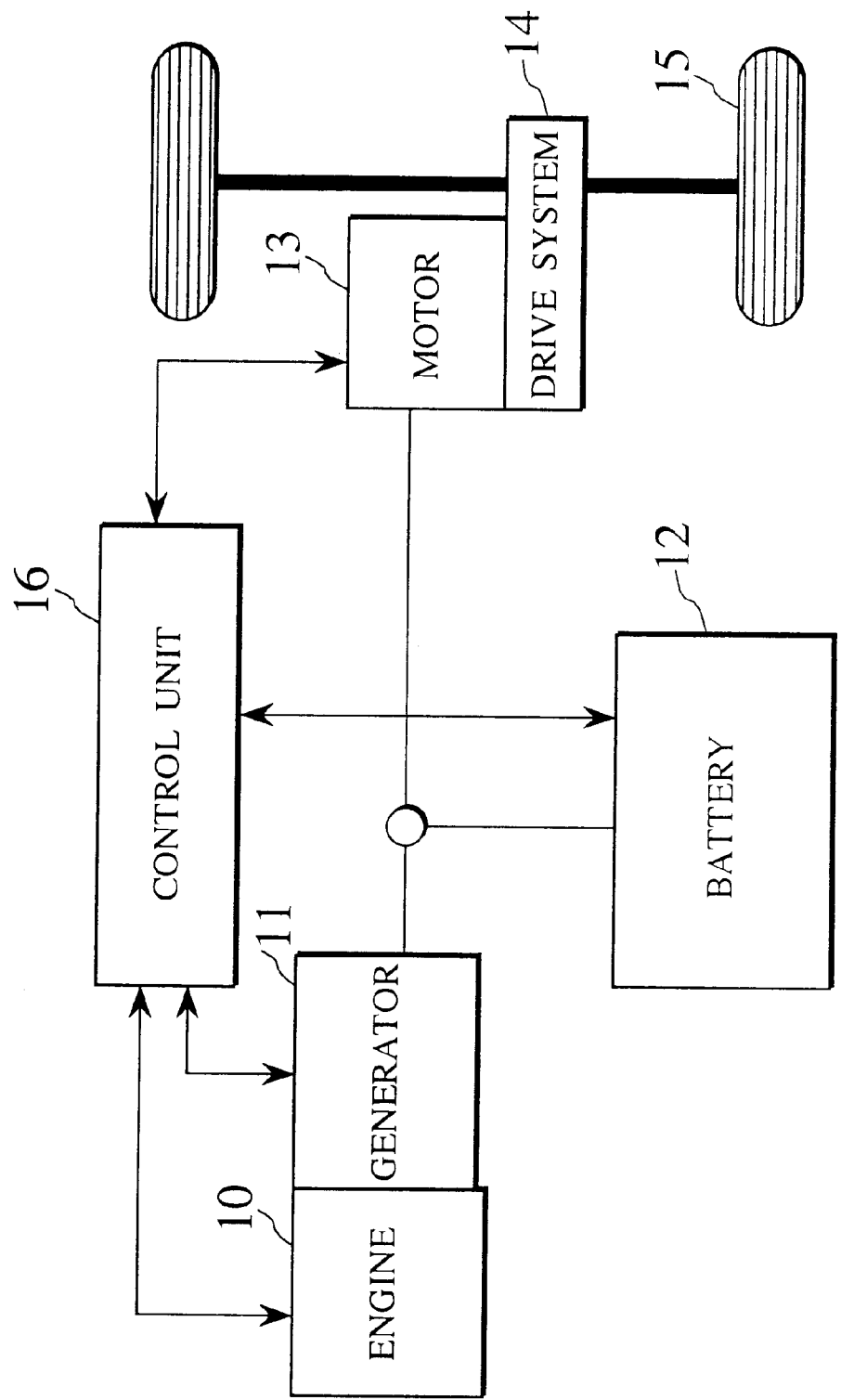
FIG. 1 is a diagram showing a systematic constitution of a series hybrid electric vehicle (SHEV) equipped with a generating control device in accordance with a first embodiment of the present invention.

FIG. 1 shows a systematic constitution of a series hybrid electric vehicle in accordance with the first embodiment of the present invention. Note, in this specification, the series hybrid electric vehicle will be referred as "SHEV", hereinafter.

As shown in FIG. 1, the SHEV comprises an engine 10, a generator 11 driven by the engine 10 to generate electricity, a battery 12 for storing and supplying electric energy, a drive motor 13 used for regenerating energy during the vehicle's driving and decelerating, a drive system 14 such as speed change gears, reduction gears etc., for transmitting the rotation of the motor 13 to drive wheels 15, and a control unit for controlling operations of the engine 10, the generator 11, the motor 13 or the like.

Note, to the motor 13, the electric power is supplied from at least one of the battery 12 and the generator 11. Normally, when the electric energy corresponding to outputs that the motor 13 requires is being ensured in the battery 12, that is, when the battery 12 is in its plentifully charged condition, the motor 13 is driven by the electric energy of the battery 12, while the engine 10 and the generator 11 driven by the engine 10 are not activated. On the contrary, when the electric energy in the battery 12 falls short of the outputs that the motor 13 requires or when the energy is less than a predetermined charging amount, the engine 10 for driving the generator 10 is driven, so that the electric power, which has been generated by the generator 11 directly or indirectly connected with the engine 10 through a transmission, a belt or the like, is supplied for driving the motor 13 or charging the battery 12. When the charging amount (charged electricity) in the battery 12 again satisfies the outputs that the motor 13 requires or when the battery 12 amounts to the predetermined charging amount, the operation of the engine 10 for driving the generator 11 is stopped to suspend the generating of the generator 10.

Based on battery temperature detected by a not-shown temperature sensor attached to the battery 12, crank angle signals from the engine 10, generation torque from the generator 11, accelerator opening from an accelerator pedal, and shifting positional signals from a transmission etc., the control unit 16 serves to control the input/output of the motor 13, the charging/discharging of the battery 12, the output of the generator 11, the operations (start, stop) of the engine 10, the engine speed due to a throttle valve etc.

Figure 2:
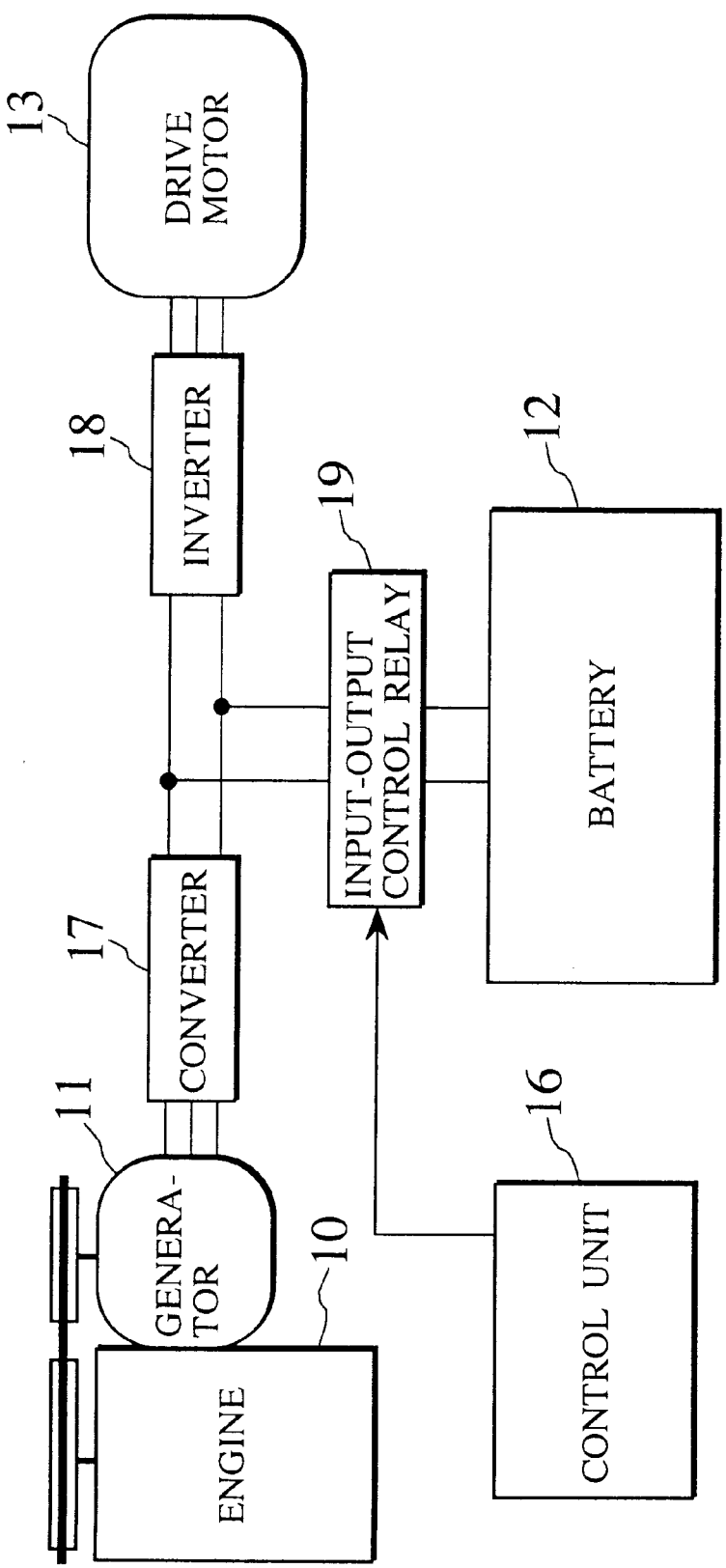
FIG. 2 is a diagram showing a detailed constitution of the series hybrid electric vehicle of FIG. 1.

FIG. 2 shows a detailed constitution of the SHEV in accordance with the first embodiment.

As a feature, the torque of the engine 10 is transmitted to the generator 11 through the belt, so that three-phases A.C. power generated by the generator 11 is converted into D.C. electric power through a converter 17. Hereat, when an input/output control relay 19 is activated by the control unit 16, the A.C. electric power from the converter 17 is stored in the battery 12 through the input/output control relay 19. Conversely, when the input/output control relay 19 is inactivated by the control unit 16, the A.C. electric power from the converter 17 is converted into the three-phases A.C. power through an inverter 18 and transmitted to the drive motor 13.

As shown in FIG. 2, the prohibition of charging/discharging of the battery 12 at the vehicle's starting or stopping can be executed by the ON-OFF control against the input/output control relay 19 in accordance with a controlling command outputted from the control unit 16. Accordingly, by making use of the input/output control relay 12 at the vehicle's traveling, the discharging between the battery 12 and the motor 13 and the charging between the battery 12 and the generator 11 can be managed by the control command from the control unit 16 optionally.

Figure 3A:
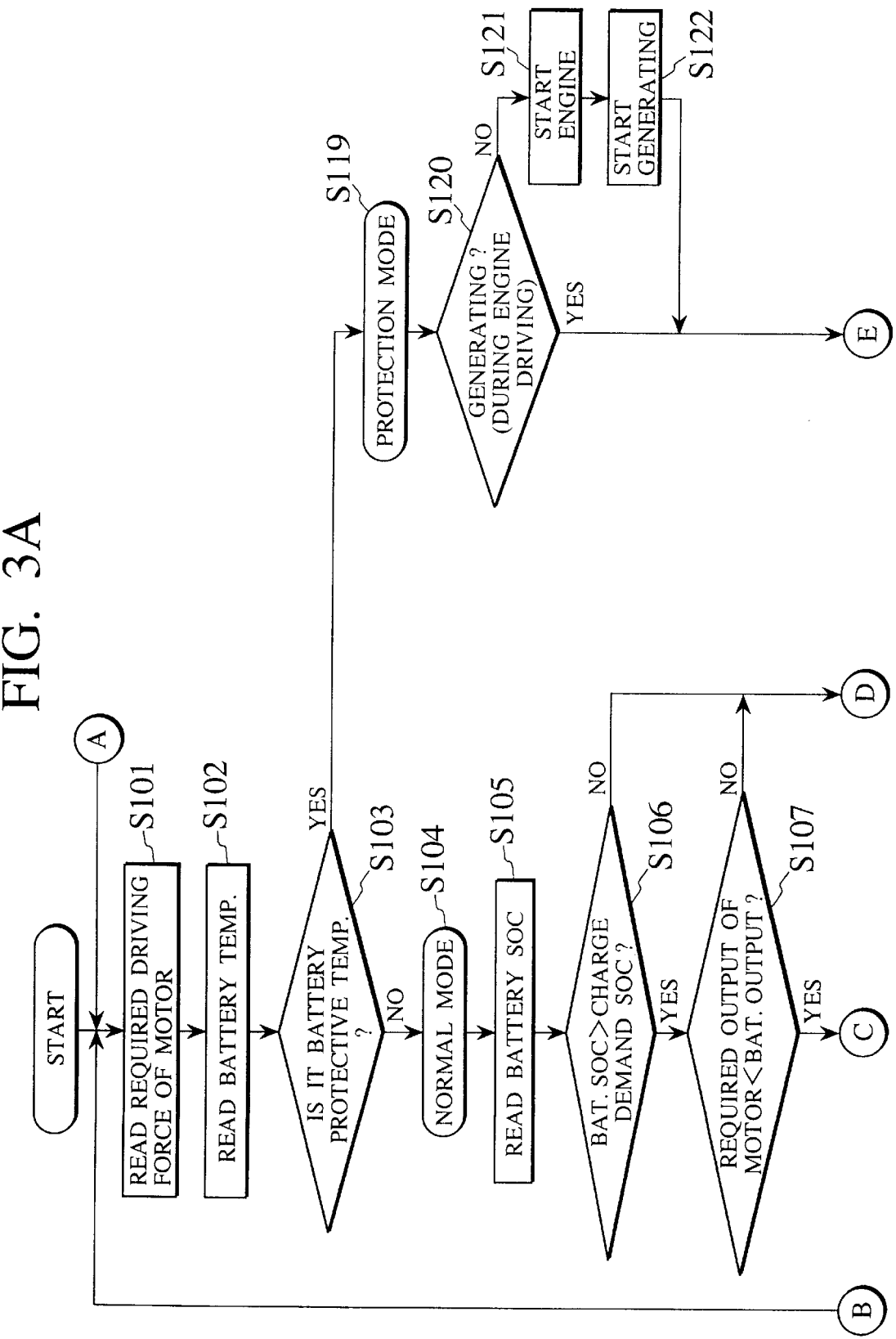
FIGS. 3A and 3B are respective elements of a flow chart for explaining an operation of a control unit of FIG. 1.
Figure 3B:
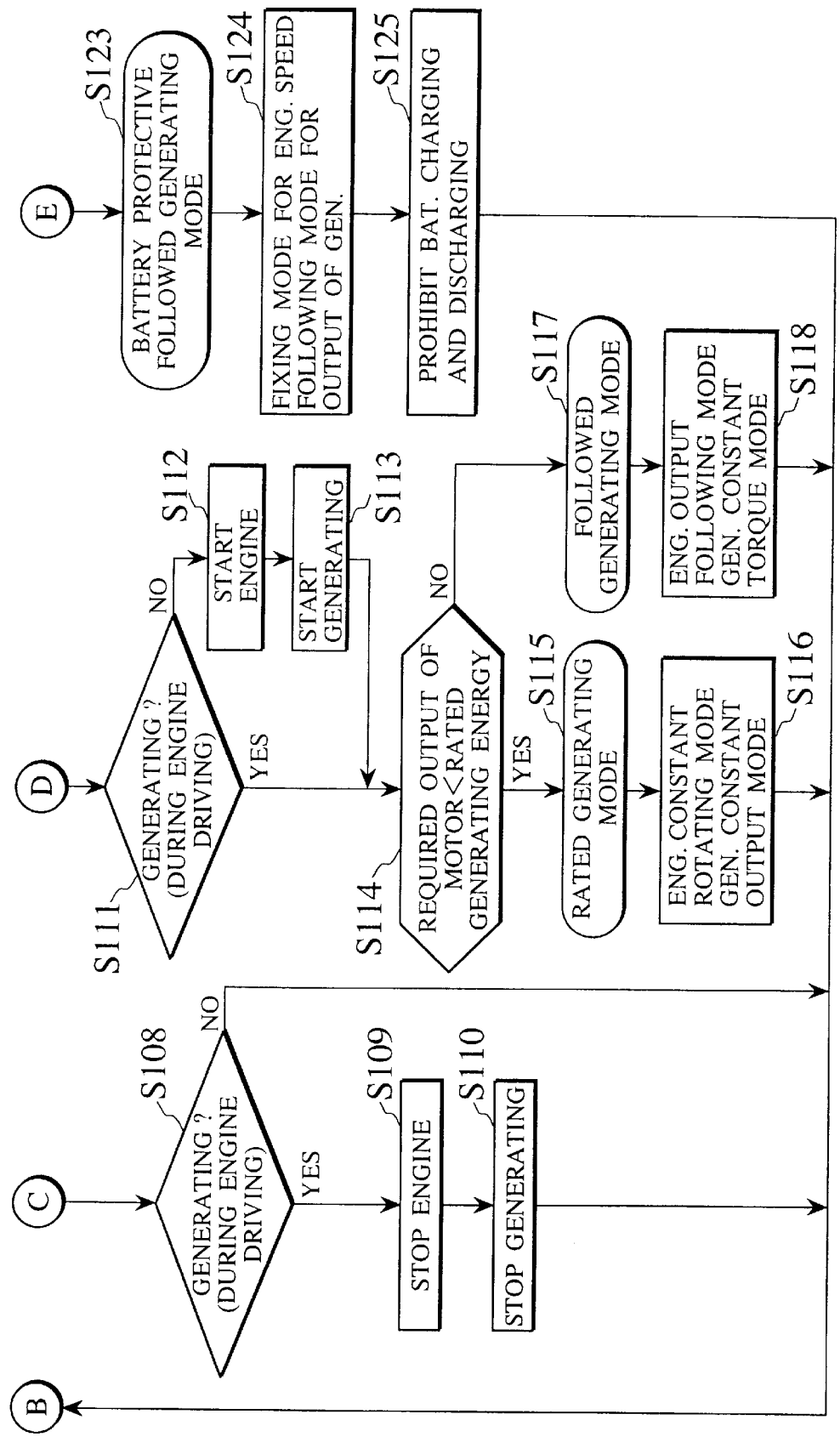

Next, we now describe the operation of the control unit 16 with reference to a flow chart of a main routine of FIG. 3A and 3B. It is noted that the main routine will be started under condition that the vehicle is capable of traveling and the control unit 16 operates irrespective of the vehicle's traveling or stopping.

At step S101, it is executed to read the required driving force (output) of the motor 13 and then, the routine goes to step S102 to read a temperature of the battery 12 (i.e. battery temp). Next, at step S103, it is judged whether the battery temperature reaches a temperature for protecting the battery 12 (i.e. battery protective temp.) or not. When the battery temperature at step S102 reaches the battery protective temperature (Yes), the routine goes to step S119 of a protection mode. While, when the battery temperature does not reach the battery protective temperature (No), the routine goes to step S104 of a normal mode.

At step S104, it is executed to set the operation of the unit 16 for the normal mode. At sequent step S105, it is executed to read the battery's state of charging (SOC). Then, at step S106, it is judged whether the value of SOC is more than a value for demanding the charging for the battery 12 (i.e. charge demand SOC). When the present SOC value is excess of the charge demand SOC, that is, the judgment at step S106 is Yes, the routine goes to step S107 because of no need to charge. On the contrary, if the judgment at step S106 is No, the routine goes to step S111.

At step S107, upon comparing the required output (driving force) of the motor 13 at step S101 with a battery dischargeable output estimated by the SOC at step S105, it is judged whether the required output of the motor 13 can be content with the battery output only. If the battery output satisfies the required output of the motor 13 (Yes), the routine goes to step S108. While, if the judgment at step S107 is No, the routine goes to step S111.

At step S108, it is judged whether the engine 10 is driven to drive the generator 11 for generating electricity or not. In case of generating, the routine goes to step S109. While, when the generator 11 is not generating electricity, the routine returns to step S101. At step S109, it is executed to stop the engine 10. At sequent step 110, the generating operation of the generator 11 is stopped because of no need to generate electricity and thereafter, the routine returns to step S101.

In detail, at step S109, the fuel injection by fuel injectors is stopped by the control command from the control unit 16, while the output of ignition signals to ignition plugs is stopped. In this way, the engine 10 can be stopped. Next, when it is judged by the control unit 18 that the output of the crank angle signals has been stopped, in other words, the rotation of the engine 10 has been stopped, the control unit 18 operates to stop the operation of the converter 17.

When the SOC value is less than the of the charge demand SOC at step S106 or when the battery dischargeable output cannot satisfy the required output of the motor 13 at step S107, the routine goes to step S111 where it is judged whether the engine 10 and the generator 11 are driving for generating electricity now.

If they are generating now (Yes), the routine goes to step S114. While, when the judgment at step S111 is No, the routine goes to step S112 where the engine 10 is started and sequent step S113 where the generating by the generator 11 is started. In this way, after a process to generate electricity is started, the routine goes to step S114.

At step S114, it is judged whether a rated generating energy of the generator 11, which has been established previously, satisfies the required output (driving force) of the motor 13 read at step S101. Note, the rated generating energy may be established to be an approximation to a value which is obtained by adding the chargeable energy for the battery 12 to the average of required output of motor 13 during the vehicle's normal traveling. When the rated generating energy of the generator 11 is more than the required driving force of the motor 13 (Yes), the routine goes to step S115. On the contrary, if the judgment at step S114 is No, the routine goes to step S117.

At step S115, it is executed to set the operation of the unit 16 as "rated generating mode". At sequent step S116, the engine 10 for driving the generator 11 is controlled into a constant rotating mode, while the generator 11 is controlled into a constant output mode. Thereafter, the routine returns to step S101.

We describe the operations at step S116 for controlling the number of rotations (i.e. engine speed) of the engine 10 for driving the generator 11. Thus, upon comparing the engine speed (number of rotations) Nset previously established in the rated generating mode with the present engine speed Neng, in case of Nset>Neng,
the opening of a throttle valve of the engine 10 is corrected to the opened side. On the other hand, in case of Nset<Neng,
the opening of the throttle valve is corrected to the closed side. In this way, the rotation of the engine 10 is controlled so as to be constant.

As to the control for the generator 11, in order to realize the rated generating energy (output) Wset previously established in the rated, it is executed to compare the energy Wset with the present generating output Wgen. Then, in case of Wset>Weng,
the generating current of the generator 11 is controlled larger. On the other hand, in case of Wset<Weng,
the generating current of the generator 11 is controlled smaller. In this way, the operation of the generator 11 is controlled so as to exhibit the predetermined rated generating output Wset.

Return to step S114, when the rated generating energy of the generator 11 is less than the required driving force of the motor 13 (No), the routing goes to step S117 to set the operation of the unit 16 as "followed generating mode". At sequent step S118, the operation of the generator 11 is controlled into a constant torque mode, while the rotation of the engine 10 is controlled so as to follow the required output of the motor 13. Thereafter, the routine returns to step S101.

In such a case, the control unit 16 operates to calculate the generating output Wset2 of the generator 11 from the required average output Wmotave of the motor 13 during the predetermined time tave and the present dischargeable output Wbat determined by the value SOC of the battery 12. Next, the torque of the generator 11 is controlled so that the present actual torque Tgen of the generator 11 is equal to the torque Tset2 previously established corresponding to the generating energy.

As to the control of the engine 10 for driving the generator 11, it is executed to compare the command engine speed (number of rotations) Nset2, which can be obtained from the values Wset2 and Tset2 every time tave, with the present engine speed Neng. Then, in case of Nset2>Neng,
the opening of the throttle valve of the engine 10 is corrected to the opened side. On the other hand, in case of Nset2<Neng,
the opening of the throttle valve is corrected to the closed side. In this way, the engine speed of the engine 10 is controlled so as to follow the required output of the motor 13.

Return to step S103, when it is judged that the temperature of the battery 12 amounts to the battery protective temperature (Yes), the routine goes to step S119 to set the operation of the control unit 16 in a battery protection mode.

At sequent step S120, it is judged whether the generating of electricity is carried out by the generator 11 at present. If the generator 11 is operating for generation, the routine goes to step S123. On the contrary, if not generating, the routine goes to step S121. At step S121, the engine 10 is started and at sequent step S122, the generating of the generator 11 is also started. Thereafter, the routine goes to step S123 where the operation of the control unit 16 is established in a followed generating mode for protecting the battery.

Under this mode, at sequent step S124, the operation of the unit 16 is established in an engine rotation constant mode where the rotations of the engine 10 is controlled so as to be a constant and also established in a generator output following mode where the output of the generator 11 is adjusted corresponding to the required output of the motor 13. After preparing for the generation by the generator 11 at step S124, it is executed to prohibit the charging and discharging operation of the battery 12 at step S125, so that thermal rising of the battery 12 can be prevented. Thereafter, the routine goes to step S101.

In order to prohibit the charging and discharging operation of the battery 12, the input/output control relay 19 is switched between its ON and OFF conditions in accordance with the command signals from the control unit 16, as shown in FIG. 2. Consequently, the output or input operation of the battery 12 is prohibited at the vehicle's starting, stopping etc. Therefore, owing to the use of the input/output control relay 19 during the vehicle's traveling, it is possible to optionally manage both of the charging operation between generator 11 and the battery 12 and the discharging operation between the battery 12 and the motor 13 by the control command of the control unit 16.

In this case, the opening of the throttle valve of the engine 10 is adjusted for controlled in a manner that the present engine speed Neng is equal to the constant engine speed Nset3 which has been established corresponding to the required output Wmot of the motor 13. In accordance with the control commands from the control unit 16, the generating energy Wgen of the generator 11 is quickly controlled so as to satisfy an equation as follows:

$$Wmot=Wgen$$

Figure 4:
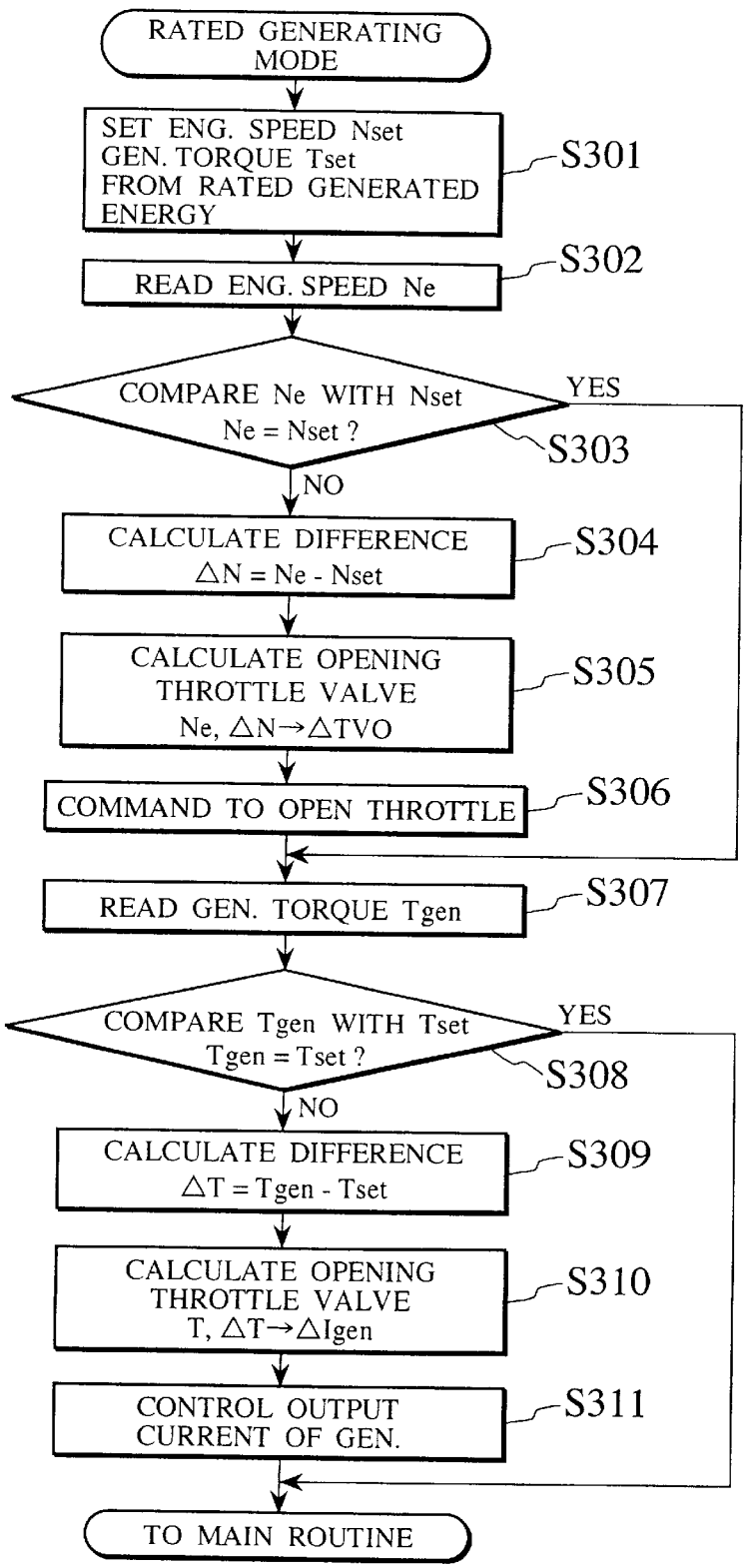
FIG. 4 is an explanatory flow chart of the detailed operation of the control unit in a rated generating mode.

We now describe the operation of the control unit 16 in the rated generating mode with reference to FIG. 4. Note, needless to say, the following sub-routine originating from step S301 of FIG. 4 is executed when the control unit 16 has judged at step S114 of FIG. 3 that the present generating condition is in the rated generating mode.

At step S301, the control unit 16 sets the engine speed Nset and the generator torque Tset from the rated generating energy. At sequent step S302, the present engine speed Ne is read for regulating the rotation of the engine 10 at a predetermined engine speed. Then, at step S303, it is carried out to compare the speed Ne with the engine speed Nset and judge whether the relationship of Ne=Nset stands up or not.

If the judgment at step S303 is Yes (i.e. Ne=Nset), the routine goes to step S307 while maintaining the present opening of the throttle valve because of no difference in engine speed therebetween. On the contrary, if there is a difference in engine speed, the routine goes to step S304 where the difference ΔN between the present engine speed Ne and the predetermined engine speed Nset is calculated by the following formula:

$$\Delta N = Ne - Nset$$

At sequent step S305, the throttle valve opening ΔTVO on target is calculated in compliance with the present engine speed Ne and the calculated difference ΔN. At step S306, in order to control the engine speed, an opening command signal corresponding to the target ΔTVO is outputted to an actuator of the throttle valve of the engine 10.

Next, at step S307, the present generator torque Tgen is read for establishing the torque of the generator 11. Then, at step S308, it is carried out to compare the torque Tgen with the set torque Tset for judging whether the relationship of Tgen=Tset stands up or not.

If the judgment at step S308 is Yes (i.e. Tgen=Tset), the routine returns to the main routine while maintaining the present output current of the generator 11. On the contrary, if there is a difference in torque, the routine goes to step S309 where the difference ΔT between the present generator torque Tgen and the predetermined torque Tset is calculated by the following formula:

$$\Delta T = Tgen - Tset$$

At sequent step S310, the command current ΔIgen is calculated in compliance with the calculated difference ΔT and the present generator torque Tgen. At step S311, in order to control the output current, a current command signal corresponding to the command Δ Igen is outputted to the generator 11 and thereafter, the routine returns to the main routine.

Figure 5:
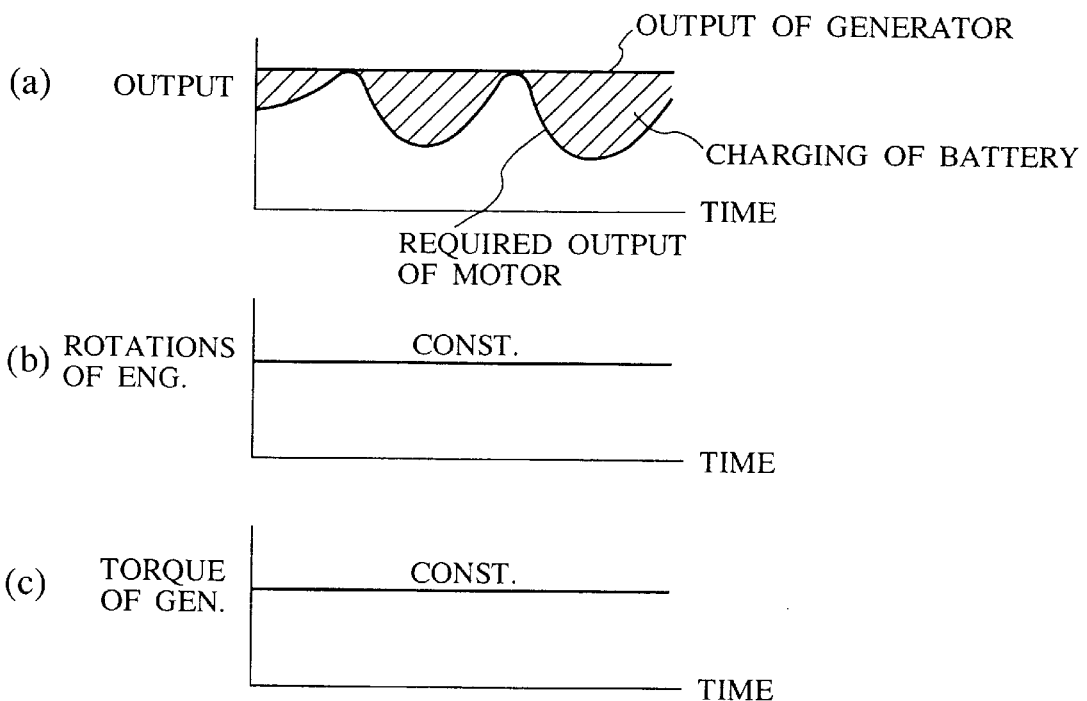
FIG. 5 is a diagram for explaining a concept of the rated generating mode.

Referring to FIG. 5, a concept of the rated generating mode will be described below. Note, in the figure, the horizontal axes of graphs (a), (b) and (c) denote axes of time in common. While, the vertical axis of graph (a) designates an output of the generator 11, the vertical axis of graph (b) an engine speed, and the vertical axis of graph(c) a torque of the generator 11, respectively.

In the rated generating mode, owing to the feed-back control based on the rotational command generated from the control unit 16 and the present engine speed Ne, a constant rotating speed of the engine 10 can be accomplished by the "electronically controlled" throttle valve operated by the actuator, as shown in the graph (b) of FIG. 5. Simultaneously, the constant output command is generated from the control unit 16 to the generator 11 for realizing its output with the constant rotations, as shown in the graph (a) of FIG. 5. Consequently, as shown in the graph (c) of FIG. 5, the generator 11 becomes regular in torque.

Therefore, as shown in the graph (a) of FIG. 5, the output of the motor 13 varies below a horizontal line of the constant output of the generator 11, so that the difference between the outputs is charged into the battery 12.

Thus, in the rated generating mode of the invention, it is assumed of a generation in case that a lead is not applied on the motor 13 too much, such as the vehicle's traveling on the street in the town. Therefore, the set value in the rated generating energy may be established so as to be the sum of a generating energy corresponding to the average required driving force of the motor 13 during the vehicle's traveling on the street in the town the and a chargeable energy of the battery 12.

Further, owing to the establishment of the driving condition of the engine 10 under constant rotations and loads, it is possible to reduce the concentration of exhaust gas discharged from the engine 10 even when traveling on the street in the town, whereby a low-pollution performance, which is required for a "hybrid" car, can be improved.

Figure 6B:
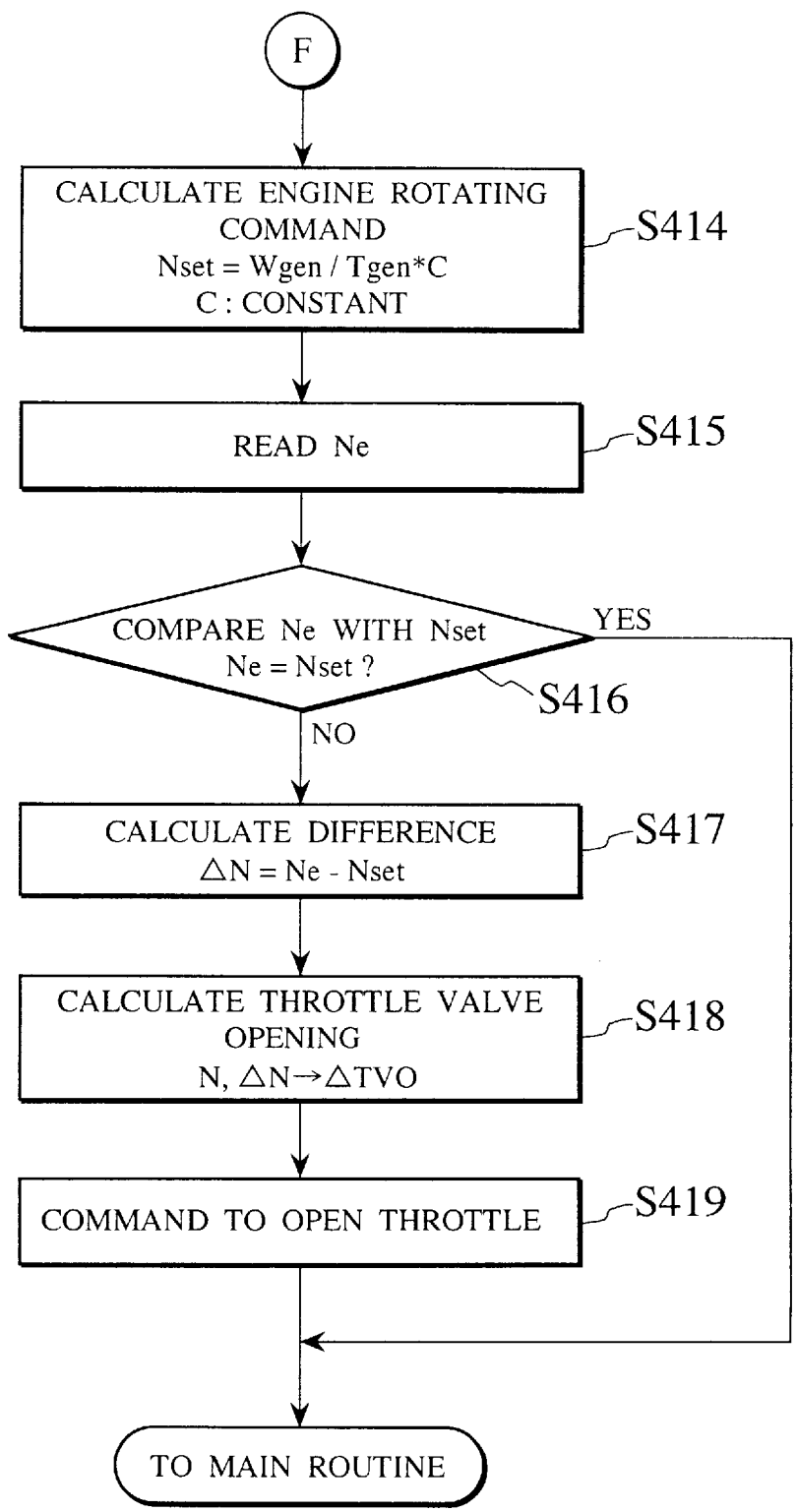

Referring to FIGS. 6A and 6B, the operation of the control unit 16 in the followed generating mode will be described below.

Note, this routine starts when the unit 16 judges the present state in the followed generating mode at step S117 of FIG. 3B.

At step S401, the present torque Tgen of the generator 11 is read to carry out the operation of the generator 11 at constant torque. At next step S402, it is executed to compare the obtained present torque Tgen with the established torque Tset.

In case of Tgen=Tset, then the routine goes to step S406. On the contrary, when there is a difference therebetween, the routine goes to step 403.

At step S403, it is executed to calculate the difference ΔT between the present generator torque Tgen and the predetermined torque Tset by the following formula:

$$\Delta T = Tgen - Tset$$

At sequent step S404, the command current ΔIgen is calculated in compliance with the calculated difference ΔT and the present generator torque Tgen. At step S405, in order to control the output current, a current command signal corresponding to the command Δ Igen is outputted to the generator 11.

Next, at step S406, in order to obtain the rotation command value for the engine 10, the number of load average calculating times N is set to an initialized value 1. At step S407, the required output Wmot of the motor 13 is read and at sequent step S408, the output Wbatt of the battery 12 is calculated from the SOC.

Then, at step S409, the required generating output Wgen is calculated by the following formula:

$$Wgen = Wmot - Wbatt$$

Thereafter, the routine goes to step S410 where the load average is calculated from the required output Wgen obtained at this time and the required output Wgen' obtained at the previous routine, as below.

$$Wgen = (Wgen + Wgen')/2$$

Next, at step S411, it is judged whether the present calculating number N amounts to a prescribed number of times for calculating the load average. When the number amounts to the prescribed number, then the routine goes to step S414. Conversely, when it does not reach the prescribed number, the routine goes to step S412.

At step 412, the previous load average Wgen' is replaced with the so-obtained load average Wgen. At next step S413, the number N is increased by one as an increment and the routine returns step S407. Thereafter, until the number N reaches the prescribed number, the above process to calculate the load average will be repeated.

At step S414, the required generating output Wgen is divided by the generator torque command Tset of the generator 11 and multiplied by a constant C, so that the engine speed command Nset can be obtained.

$$Nset=Wgen/Tset*C$$

Next, at step S415, the present engine speed Ne is read and then the routine goes to step 461 where the prescribed engine speed Nset is compared with the present engine speed Ne.

When the relationship of Ne=Nset is established between the present engine speed Ne and the prescribed engine speed Nset, the routine returns the main routine. On the contrary, when the above relationship is not established, the routine goes to step S417.

At step S417, it is executed to calculate the difference ΔN between the present engine speed Ne and the prescribed engine speed Nset by the following formula:

$$\Delta N=Ne-Nset$$

At step 418, the throttle valve opening ΔTVO is calculated in compliance with the calculated difference ΔN and the present engine speed Ne. Next, at step S419, the throttle opening command corresponding to the obtained opening ΔTVO is generated to the actuator for the throttle valve thereby to control the engine speed of the engine 10 by the average of the required generating outputs within a predetermined period. Thereafter, the routine returns the main routine.

Figure 7:
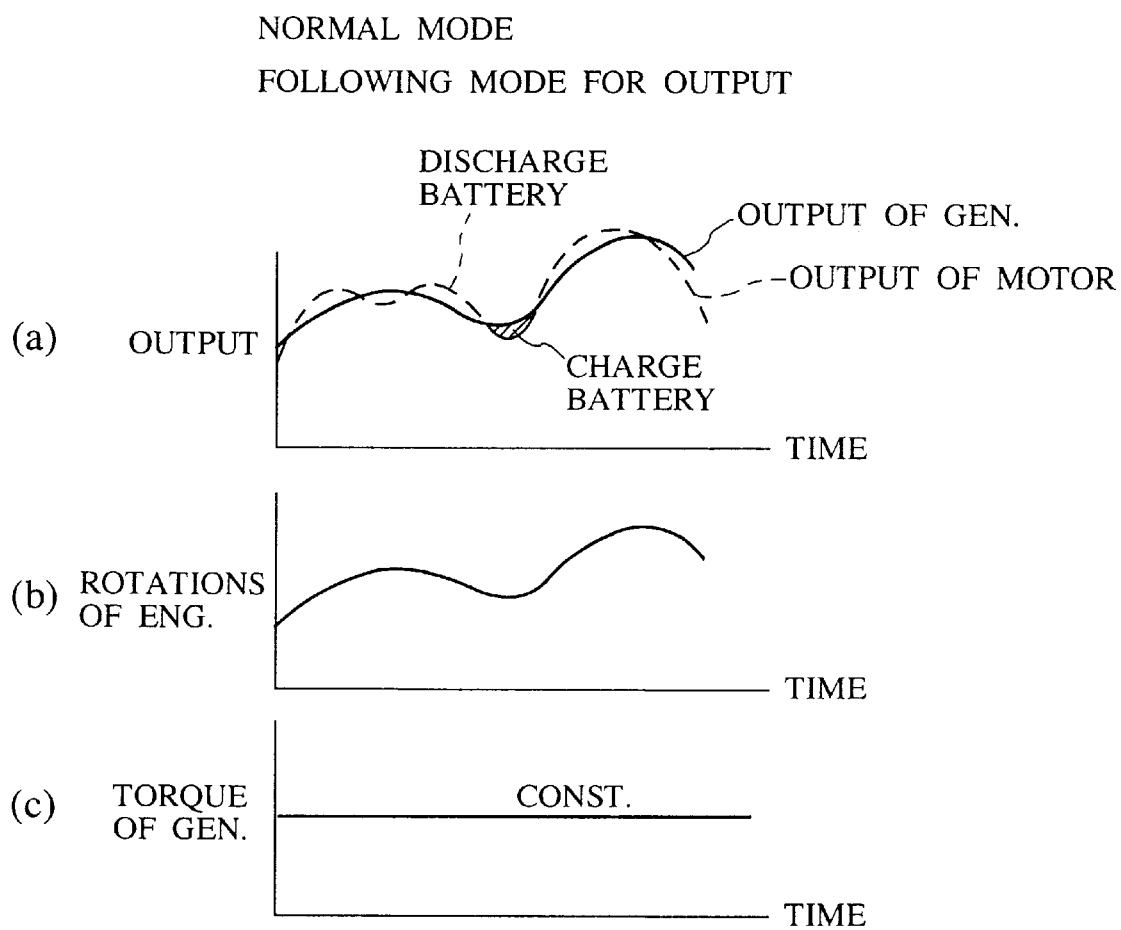
FIG. 7 is an explanatory flow chart of the detailed operation of the control unit in the followed generating mode.

Hereat, we describe a concept of the followed generating mode in the normal mode with reference to FIG. 7. Note, in the figure, characters designated by the horizontal and vertical axes of graphs (a), (b) and (c) are similar to those of FIG. 5, respectively.

In the followed generating mode, as shown in graph (b) of FIG. 7, the engine speed is so controlled that the generating output follows the required output of the motor 13 as shown in graph (a) of FIG. 7 on one hand. On the other hand, the generator 11 is controlled to operate at a constant torque, as shown in graph (c) of FIG. 7.

In graph (a) of FIG. 7, it will be found that the generator output does not always follow the motor output in a moderated wave pattern. This comes from the following reason. That is, if the engine speed is controlled to follow variations of the motor output precisely, then the air fuel ratio of the engine will be changed and consequently, the exhaust performance will be deteriorated since the variations of air-flow is increased periodically. Therefore, in order to cope with the variations of the motor output, it is preferable to control the generator output of the generator by means of time hysteresis, the averaged motor output or the like. Further, as to the difference between the motor output and the generator output, when the generator output is larger than the motor output, the battery is charged. On the contrary, when the former is less than the latter, the electricity is discharged from the battery.

In the present device, while the operation of the generator 11 is controlled by electrical signals, the engine 10 is controlled by the air-flow in intake pipes (not shown) which is controlled by the throttle valve. Thus, if simultaneously controlling both characters in spite of a difference in momentary responsibility therebetween, problems such as hunting would be caused thereby to diffuse the controllability. This is the reason why the generator 11 is controlled so as to have such a constant torque in the followed generating mode (see (c) of FIG. 7).

Further, the reason why the engine speed is controlled so as to follow the required motor output in the followed generating mode is to realize driving feel (i.e. drivability) having no sense of incompatibility in terms of noise and vibration. On the contrary, if the engine speed is controlled so as to follow the actual motor output, the sense of incompatibility will be produced in terms of noise and vibration.

Figure 8:
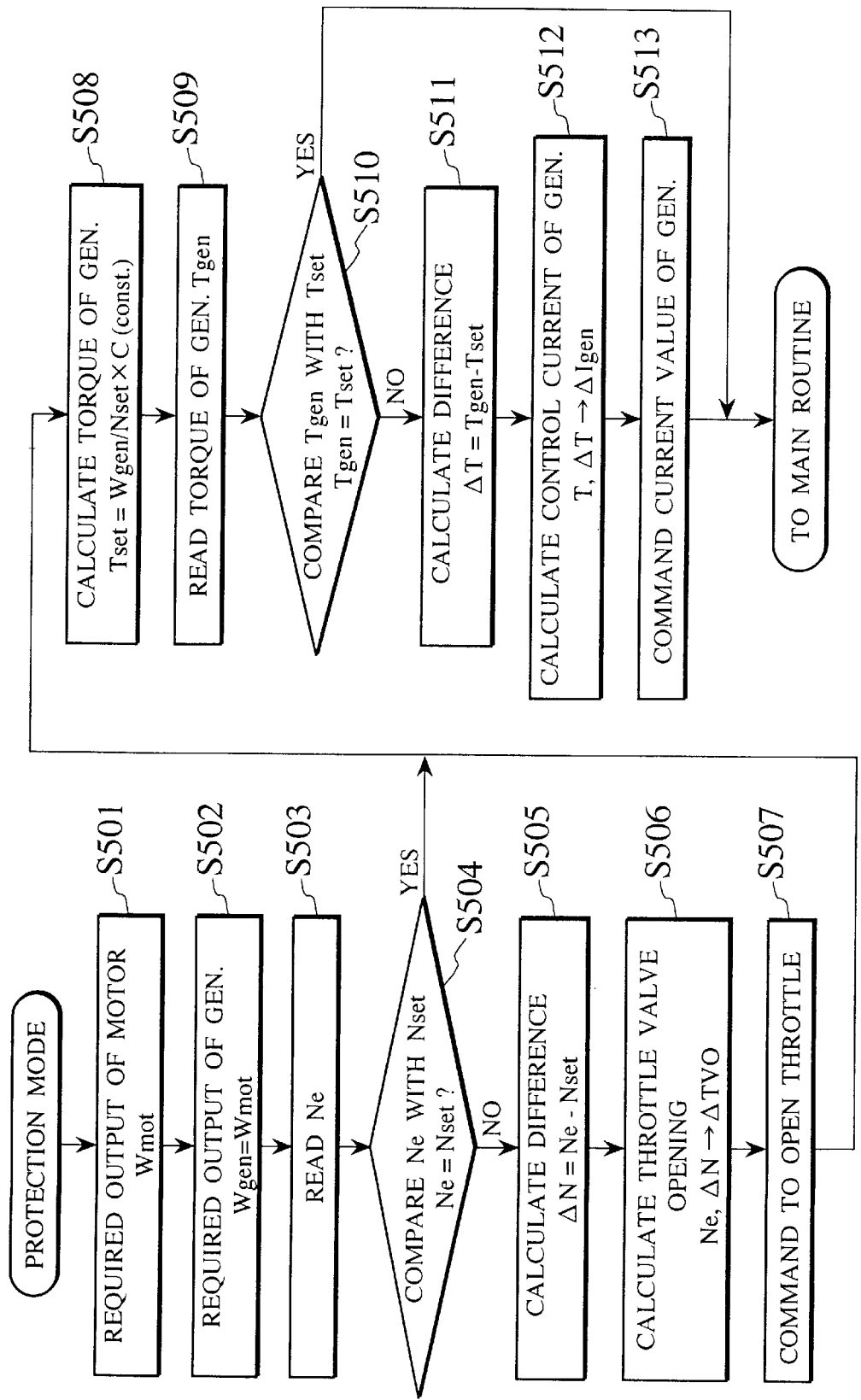
FIG. 8 is an explanatory flow chart of the detailed operation of the control unit in a protection mode.

Referring to FIG. 8, the operation of the control unit 16 in the protection mode will be described below.

When the unit 16 judges at step S119 of FIG. 3B that the present state is in the protection mode, the routine goes to step S501 of FIG. 8.

At step S501, the required output Wmot of the motor 13 is read. At next step S502, it is executed to establish the obtained output Wmot as a required generating output Wgen of the generator 11, as below.

$$Wgen=Wmot$$

Next, in order to control the engine speed Ne to be a prescribed constant speed, the present engine speed Ne is read at step S503. At sequent step S504, it is executed to compare the present engine speed Ne with the prescribed engine speed Nset. In case of Ne=Nset, then the routine goes to step S508. On the contrary, when there is a difference therebetween, the routine goes to step 505.

At step S505, it is executed to calculate the difference ΔN between the present engine speed Ne and the prescribed engine speed Nset by the following formula:

$$\Delta N=Ne-Nset$$

At sequent step S506, the throttle valve opening ΔTVO is calculated in compliance with the calculated difference ΔN and the present engine speed Ne. Next, at step S507, the throttle opening command corresponding to the obtained opening ΔTVO is generated to the actuator for the throttle valve thereby to control the engine speed of the engine 10.

At step S508, the required generating output Wgen at that time is divided by the engine speed command Nset and multiplied by a constant C, so that the torque command Tset can be obtained.

$$Tset=Wgen/Nset*C$$

Next, at step S509, the present generator torque Tgen is read to set the torque of the generator 11 and then the routine goes to step S510 where the prescribed engine speed Tset is compared with the present generator torque Tgen.

When the relationship of Tgen=Tset is established, then the routine returns the main routine while the generator 11 maintains the present current. On the contrary, when the above relationship is not established, the routine goes to step S511.

At step S511, it is executed to calculate the difference ΔT between the prescribed engine speed Tset and the present generator torque Tgen by the following formula:

$$\Delta T=Tgen-Tset$$

At step S512, the command current ΔIgen is calculated in compliance with the calculated difference ΔT and the present generator torque Tgen. At step S513, the current control command ΔIgen is outputted to the generator 11 to control the output current. Thereafter, the routine returns the main routine.

Figure 9:
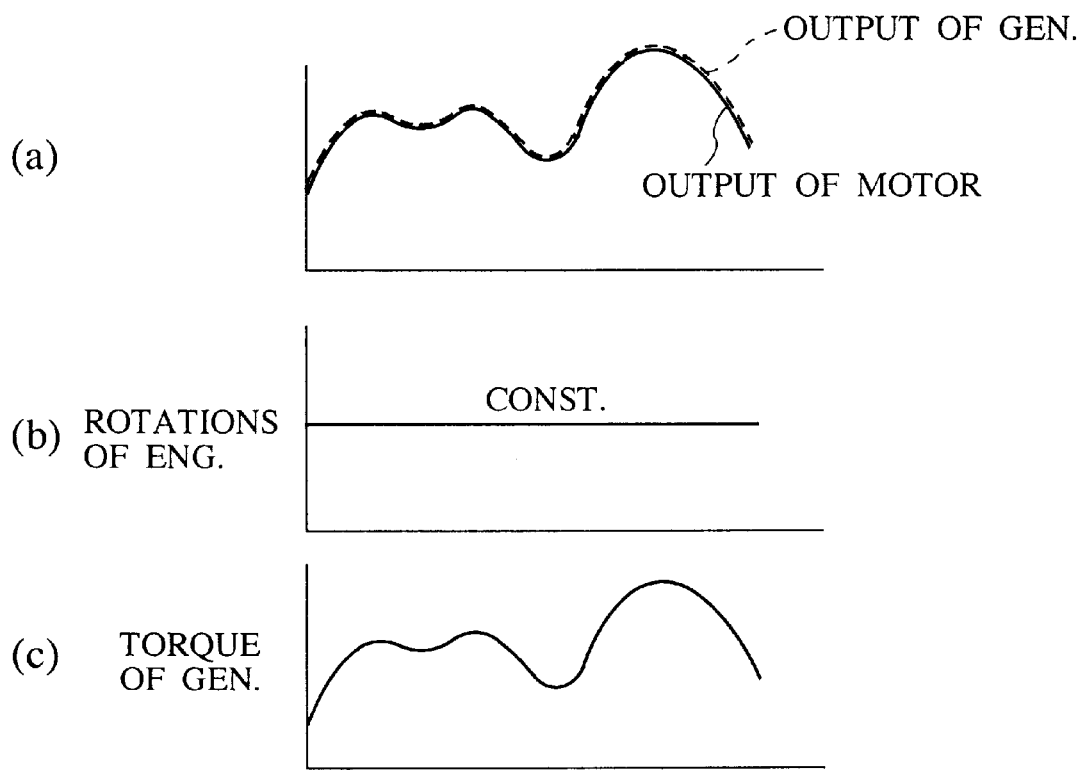
FIG. 9 is an explanatory flow chart of the detailed operation of the control unit in the protection mode.

Hereat, we describe a concept of the followed generating mode in the battery protection mode with reference to FIG. 9. Note, in the figure, characters designated by the horizontal and vertical axes of graphs (a), (b) and (c) are similar to those of FIG. 5, respectively.

In the followed generating mode in the battery protection mode, as shown in graph (b) of FIG. 9, the engine speed is so controlled as to be constant. While, in order to cause the generator output to follow the required motor output as shown in graph (a) of FIG. 9,t the generator 11 is controlled so that the torque output follows the required motor output, as shown in graph (c) of FIG. 9.

In the followed generating mode in the battery protection mode, since the charging and discharging of the battery 12 are prohibited, the generator output has to be controlled so as not to be late for the motor output. That is, since it is impossible to make the generator output follow the motor output in the control method of following the engine speed, the engine is controlled to be a constant engine speed, while the generator output is controlled so as to accord with the motor output. In this way, it is possible to maintain the drivability without reducing the required motor output and to avoid the deterioration of the battery 12 due to its increased temperature.

According to the embodiment, since the operational mode of the generating system is changed on a basis of the temperature of the battery 12, the charged electricity and the required motor output and the operation method is established every mode, it is possible to reduce the deterioration of the battery 12 and to maintain the improved driving performance of the vehicle. In addition, the present invention can be applied on various kinds of batteries.

(Second embodiment)

The second embodiment of the invention is applicable to the SHEV system shown in FIG. 1 and the detailed SHEV system of FIG. 2.

Figure 10:
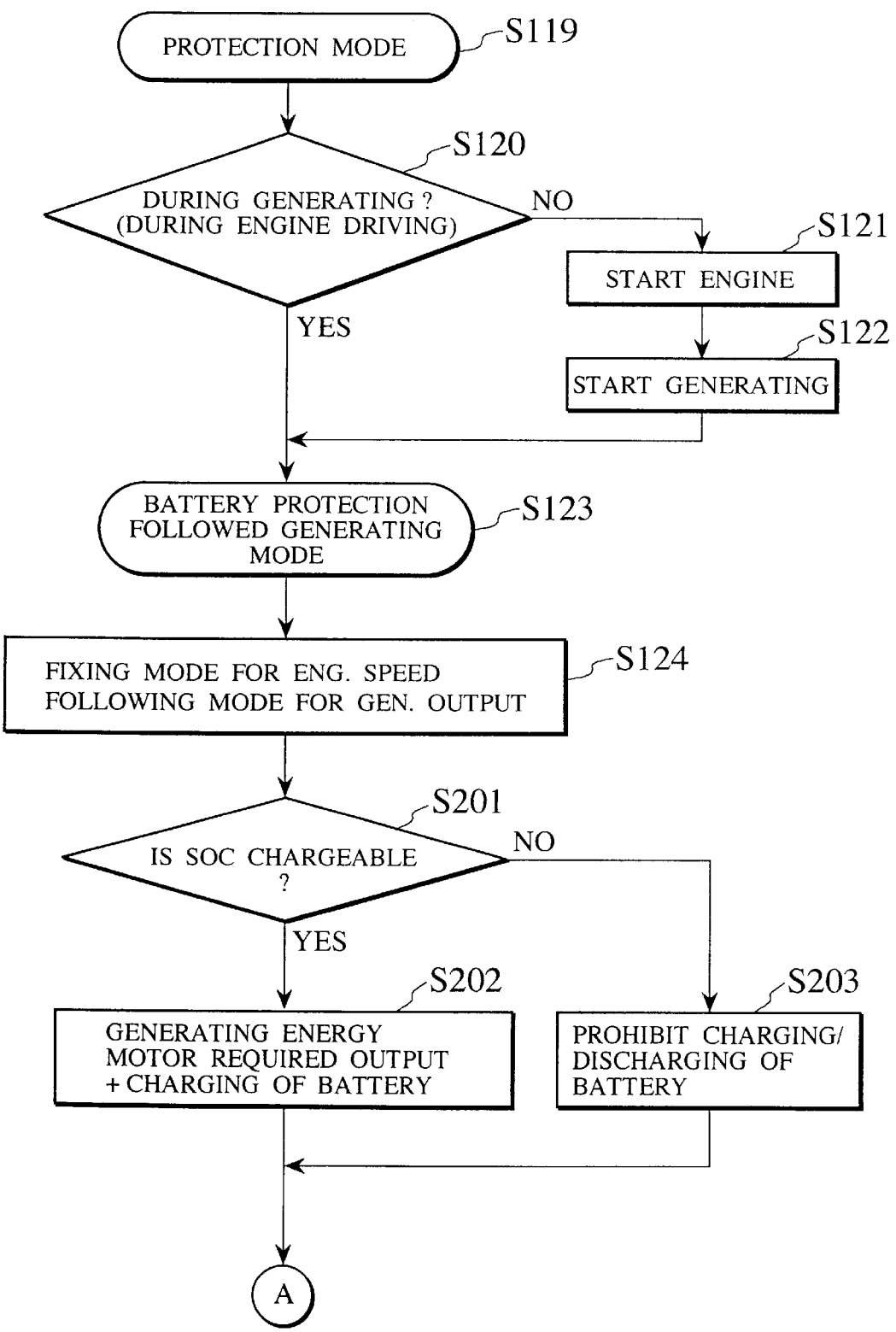
FIG. 10 is a flow chart of the operation of the generating control device, in accordance with a second embodiment of the present invention.

We now describe the operation of the control unit 16 in accordance with the second embodiment, with reference to FIG. 10. Note, the shown flow chart corresponds to the routine on and after step S119 in the battery protection mode in the first embodiment. Again, since the processes from step S119 to step S124 are similar to those of the first embodiment, their descriptions will be eliminated.

At sequent step S201, upon reading the SOC of the battery 12 by the control unit 16, it is judged whether the battery 12 is in the chargeable condition or not. If the judgment at step S201 is Yes, the routine goes to step S202. Conversely, if the judgment is No, the routine goes to step S203.

At step S202, it is executed to add charging amount for cooling the battery 12 to the required motor output and establish the result as the generating output (energy). Thereafter, the routine returns to the starting point of the main routine (see a letter A of FIG. 3A).

On the other hand, at step S203, it is executed to prohibit the charging and discharging operation of the battery 12 by the control unit 16 and thereafter, the routine returns to the starting point.

For example, if a lithium type of battery is adopted as the battery 12 and it is charged to have appropriate electricity, it is possible to cool the battery itself due to its endothermic reaction during the charging. The process at step S202 would be realized by positively utilizing the above property of the lithium battery.

Also in this embodiment, since the operational mode of the generating system is changed on a basis of the temperature of the battery 12, the charged electricity and the required motor output and the operation method is established every mode, it is possible to reduce the deterioration of the battery 12 and to maintain the improved driving performance of the vehicle. Again, by using the battery, such as the lithium battery, exhibiting the endothermic reaction during its charging operation, it is possible to reduce the battery temperature and to recover the condition of the device for the normal mode early.

Finally, it will be understood by those skilled in the art that the foregoing description is preferred embodiments of the disclosed generating control device, and that various changes and modifications may be made to the present invention without departing from the spirit and scope thereof.

What is claimed is:

1. A generating control device for hybrid vehicle comprising:

an electric motor for driving the hybrid vehicle;

a battery for supplying the electric motor with electrical energy;

a generator for generating electrical energy for the electric motor and the battery;

an internal combustion engine for driving the generator; and a controller changing operations of the generator and the internal combustion engine in accordance with a plurality of operational modes for preventing the battery from deteriorating, the controller being responsive to a temperature of the battery; wherein, when the temperature of the battery amounts to a battery protective temperature a battery protection mode is set, when the temperature of the battery does not amount to the battery protective temperature, a state of charge is not less than a predetermined charged amount and a required output of the electric motor can be satisfied by using only a battery output, a mode in which the internal combustion engine is stopped and a generating operation of the generator is stopped is set, when the temperature of the battery does not amount to the battery protective temperature, the state of charge is not more than the predetermined charged amount and a rated generating energy of the generator satisfies a required output of the electric motor, a rated generating mode is set, when the temperature of the battery does not amount to the battery protective temperature, the state of charge is not more than the predetermined charged amount and the rated generating energy of the generator does not satisfy the required output of the electric motor, a followed generating mode is set, the battery protection mode controls a rotation of the internal combustion engine to be constant, controls an output of the generator to follow the required output of the electric motor, and prohibits a charging and discharging operation of the battery, the rated generating mode controls the rotation of the internal combustion engine to be constant and controls the output of the generator to be constant, and the followed generating mode controls a torque of generator to be constant and controls the rotation of the internal combustion engine to follow the required output of the electric motor.

* * * * *